(12) United States Patent
Ylitalo et al.

(10) Patent No.: US 8,665,782 B2
(45) Date of Patent: Mar. 4, 2014

(54) LOOP-DETECTION IN MOVING NETWORKS

(75) Inventors: Jukka Ylitalo, Espoo (FI); Patrik Salmela, Kirkkonummi (FI); Teemu Rinta-Aho, Espoo (FI); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 570 days.

(21) Appl. No.: 12/443,624

(22) PCT Filed: Sep. 29, 2006

(86) PCT No.: PCT/EP2006/066936
§ 371 (c)(1),
(2), (4) Date: Nov. 6, 2009

(87) PCT Pub. No.: WO2008/037298
PCT Pub. Date: Apr. 3, 2008

(65) Prior Publication Data
US 2010/0097986 A1    Apr. 22, 2010

(51) Int. Cl.
*H04L 12/28*    (2006.01)
(52) U.S. Cl.
USPC .......................................................... 370/328
(58) Field of Classification Search
None
See application file for complete search history.

(56) References Cited

U.S. PATENT DOCUMENTS

2005/0135275 A1*  6/2005  Hester et al. ................... 370/256
2006/0077964 A1*  4/2006  Wu et al. ........................ 370/352
2006/0084411 A1*  4/2006  Lo et al. ......................... 455/411
2007/0233626 A1* 10/2007  Rupp et al. ....................... 706/20
2008/0004017 A1*  1/2008  Shimizu ....................... 455/435.1

FOREIGN PATENT DOCUMENTS

EP        1 503 549 A1    2/2005

OTHER PUBLICATIONS

Das, S. et al. "Performance Comparison of Scalable Location Services for Geographic Ad Hoc Routing." IEEE INFOCOM, Mar. 13, 2005.
Giruka, et al. "Two Scalable Location Service Protocols for Wireless Ad Hoc Networks." Pervasive and Mobile Computing, Elsevier, NL. vol. 2, No. 3. Sep. 2006.

* cited by examiner

*Primary Examiner* — Jae Y Lee
*Assistant Examiner* — Alan Lindenbaum

(57) ABSTRACT

A method of generating network identifiers for use by mobile routers of a moving network is provided which enables fast and efficient routing loop avoidance and detection. The method comprises receiving at a mobile router of a sub-network chain, a beacon from a preceding mobile router in the chain, the beacon containing a network identifier of the preceding mobile router, generating a new network identifier by applying a pre-defined function to the received network identifier, and including the new network identifier in beacons broadcast by the receiving mobile router. When preparing for a handover, a mobile router compares the network identifier contained in a received beacon with values generated by applying said function against its own network identifier. This allows the mobile router to identify beacons originating from mobile routers that are downstream in the same chain.

15 Claims, 5 Drawing Sheets

LOOP-DETECTION IN MOVING NETWORKS

TECHNICAL FIELD

The present invention relates to loop detection in moving networks and in particular to loop detection in nested moving networks.

BACKGROUND

Trains, busses, airplanes and Personal Area Networks (PANs) are examples of use cases where moving network technologies can be applied. A moving wireless network is a cluster consisting of mobile nodes (MNs) and mobile routers (MRs). A mobile router routes IP traffic between a mobile node and the Internet (or other IP network). A mobile router may be connected to another moving network or directly to the Internet via an access point (AP). In the former case, a set of nested mobile networks results. FIG. 1 illustrates a set of three nested mobile networks, where each mobile router is co-located with an access point. Each mobile router has at least two interfaces. One interface (e.g. IEEE 802.11) is used to connect the mobile router to an access point. The other interface (e.g. IEEE 802.11) works as an access point for the mobile router's clients (either mobile nodes or other mobile routers). In FIG. 1, the MR#1 is directly attached to an access point (AP#4) that is located in the Internet. At the same time, MR#1 works as an access point for its own clients, e.g. MR#2. As a result, MR#2 provides connectivity to the Internet through MR#1. Finally, MR#3 is connected through the MR#2 and MR#1 to the Internet. A mobile router may make "handover" from one other router to another (or to/from the Internet) as the routers move.

Each access point broadcasts "beacons" to advertise its existence. A beacon typically contains a network ID and radio specific parameters. As an example, IEEE 802.11 Access Points (or nodes of an "ad-hoc network which does not employ access points) send out a beacon message every 50 to 200 ms. The size of this beacon is typically 60 to 90 bytes and the information it contains is usually long-term (i.e. it doesn't change very often). It is possible to add new fields to the beacons, but increasing their size reduces the available bandwidth for user data. Any additions should be as small as possible.

Moving networks use the concept of a service set identifier (SSID) which is a code attached to all packets on a wireless network to identify each packet as part of that network. The code is a case sensitive text string which consists of a maximum of 32 alphanumeric characters. All wireless devices attempting to communicate with each other must share the same SSID. In an "infrastructure network" employing access points, a network operator will typically set the SSID at the access point for that network and the access point will include its SSID in the beacons that it broadcasts. In the case of nested moving networks (as illustrated in FIG. 1), each sub-network will have its own SSID which is broadcast by the access point of that sub-network.

The SSID is in effect a "user-friendly" address based upon which a mobile node or mobile router can decide whether or not to attach to the broadcasting access point. If a mobile node or mobile router makes a decision to attach, it uses a Media Access Control (MAC) address of the access point in the one-round trip attachment exchange in order to attach to the access point. The MAC address of the access point is a statically defined address and is included in the beacon.

A potential problem with the existing moving network architecture and functionality is illustrated in FIG. 2. In FIG. 2, the mobile router (MR#1) is listening to beacons that are sent by a number of different access points including two fixed Internet access points AP#4 and AP#5. If MR#1 does not have any a priori knowledge of the access points, it may attach to any one of the available access points. Thus, if MR#1 decides to attach to MR#2 or MR#3 (or indeed to itself), the result will be a routing loop. Packets that are sent out from the client side interface of MR#3 will arrive directly or indirectly at the same mobile router's access point interface. The routing loop situation is illustrated in FIG. 3.

One known way to identify the existence of a routing loop is to send a probe message from a mobile router after attaching it to an access point. If the sending router receives its own probe message it knows that it is in a routing loop. However, this approach is slow, particularly where there are several nested mobile routers attached to each other. Another possible solution is to add information to routing advertisement messages (specified as part of the IPv6 protocol suite). This information might comprise a unique chain identifier and a sequence number. However, the trade-off is that the client must be attached to the access point before it can receive router advertisements. Furthermore, this approach cannot be applied in IPv4 networks, as router advertisements work only with IPv6.

SUMMARY

According to a first aspect of the present invention there is provided a mobile router for use in a moving network, the mobile router comprising:
  means for receiving a beacon broadcast by a further mobile router or a fixed access point, said beacon containing a first network identifier belonging to the broadcasting mobile router or fixed access point;
  means for attaching to said further mobile router or fixed access point using said first network identifier;
  means for generating a second network identifier by applying a pre-defined function to said first network identifier; and
  means for broadcasting beacons containing the second network identifier.

Implementation of the present invention allows the creation of a chain of sub-networks in which each mobile router is able to pre-determine the network identifiers that will be used by other mobile routers lower down in the chain. This allows routing loops to be detected and avoided or terminated.

The mobile router may be a wireless router, or a router having at least one wireless interface.

It will be appreciated that the term "mobile router" as used here identifies a mobile router with associated access point functionality. That is to say that the mobile router has at least two interfaces, one for attaching to an upstream access point and another for attaching to a downstream mobile router.

Preferably, said means for attaching comprises means for iteratively applying said pre-defined function to said first or second network identifiers to obtain a chain of network identifiers, and means for comparing a network identifier contained in a subsequently received beacon against the network identifiers of said chain and, in the event of a match, for rejecting the associated broadcasting mobile router as a possible point of attachment.

The invention is applicable in particular to a mobile router that is compliant with the IEEE 802.11 standard.

Preferably, said pre-defined function is a recursive function. For example, the function may be a Lamports one-way scheme. The Lamports scheme may employ SHA or MD5.

Preferably, said means for broadcasting beacons comprises means for constructing beacons containing said second network identifier and one or more of the following:
- a static identifier;
- a checksum calculated over the remainder of the beacon;
- a beacon counter indicating the number of different beacons that the mobile router is concurrently broadcasting; and
- a link counter indicating the number of values in the hash chain.

Preferably, said means for attaching comprises means for storing a previous chain of network identifiers following generation of a new network identifier, said means for comparing a network identifier contained in a subsequently received beacon against the network identifiers of said chain, also comparing the received network identifier against the network identifiers of the previous chain. More preferably, said previous chain is stored for a predefined time period before being discarded.

Said mobile router may comprise two or more upstream interfaces, i.e. the mobile router may be multi-homed. In this case, said means for receiving receives in use first network identifiers from two or more further mobile routers or fixed access points and said means for attaching attaches to both or all upstream mobile routers or fixed access points. Said means for generating applies the pre-defined function to the first network identifiers to generate respective second network identifiers. The means for broadcasting broadcasts beacons containing the second network identifiers in a cyclical manner.

According to a second aspect of the present invention there is provided a method of generating network identifiers for use by mobile routers of a moving network, the method comprising, receiving at a mobile router of a sub-network chain a beacon from a preceding mobile router in the chain, the beacon containing a network identifier of the preceding mobile router, generating a new network identifier by applying a pre-defined function to the received network identifier, and including the new network identifier in beacons broadcast by the receiving mobile router.

By generating network identifiers in a recursive manner based upon a network identifier higher in the chain, a mobile router seeking to change it point of attachment is able to easily determine whether or not an available access point is associated with a mobile router lower in the chain than itself.

Preferably, a mobile router or fixed access point at the top of the sub-network chain generates its own network identifier, i.e. as a random value. However, if the node(s) at the top of the chain do(es) not support the network identifier generation mechanism described here, it may be the first mobile router in the chain that does support the mechanism that generates its own identifier (e.g. as a random value).

DETAILED DESCRIPTION

The procedure to be described hereinafter relies upon access points having the ability to dynamically define their network identifiers (SSIDs). Access points derive their network identifiers based upon the network identifiers of sub-networks higher up in the sub-network chain. A mobile router is able to determine whether or not an access node for which a beacon is received is lower in the sub-network chain than itself by checking if the network identifier contained in the beacon is derived from the network identifier associated with the mobile router. A preferred mechanism to achieve loop-detection will now be described.

Figure 1:
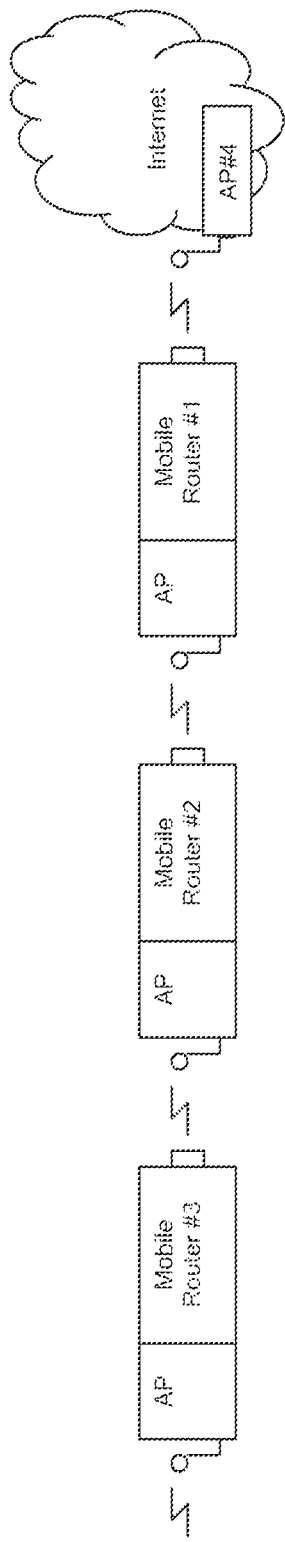
FIG. 1 illustrates schematically a moving wireless network comprising a plurality of nested sub-networks.
Figure 2:
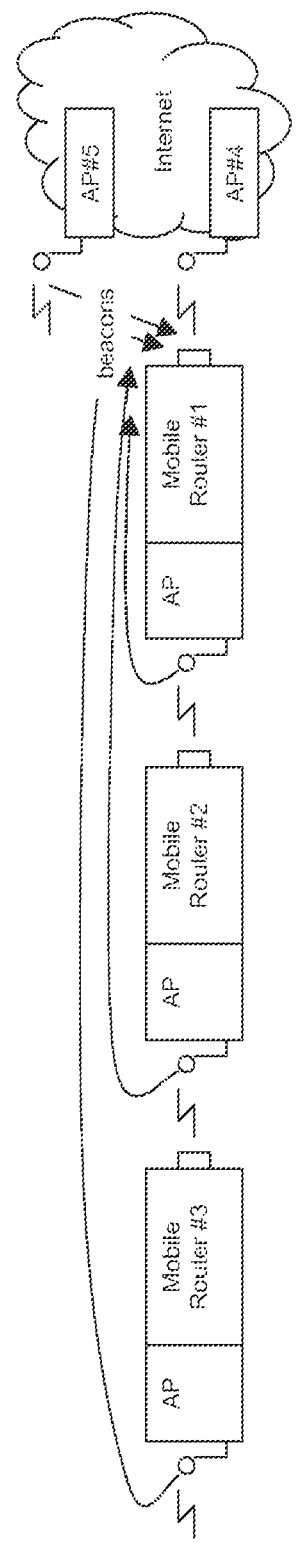
FIG. 2 illustrates schematically beacons received at a mobile router of the moving network of FIG. 1.
Figure 3:
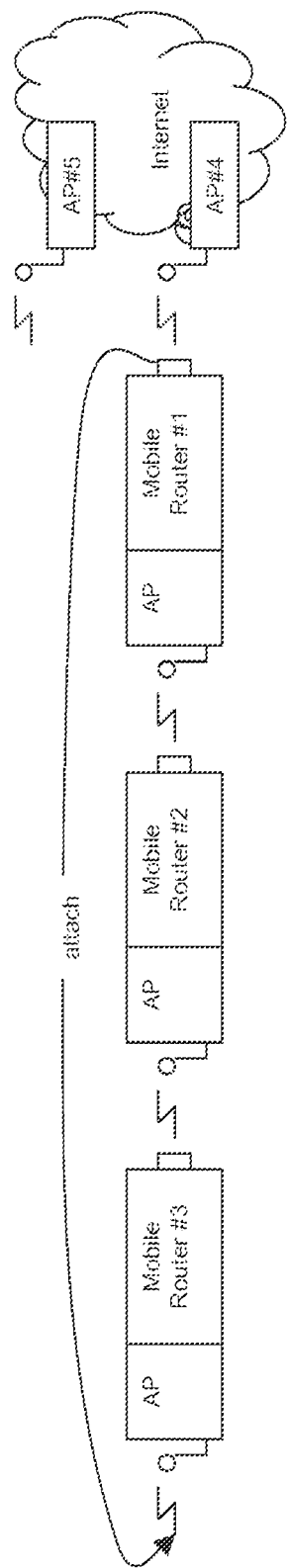
FIG. 3 illustrates schematically a routing loop arising in the moving network of FIG. 1.
Figure 4:
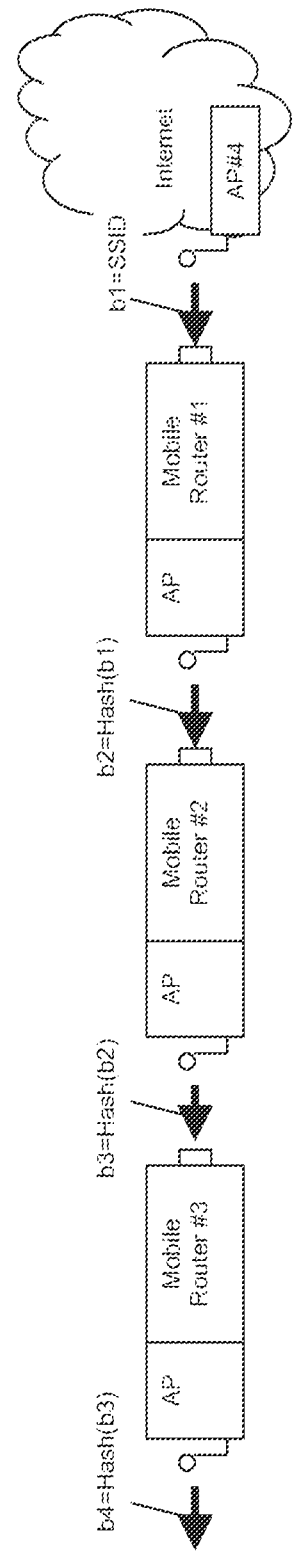
FIG. 4 illustrates schematically the use of a hash chain to generate network identifiers in a moving network chain.

With reference to FIG. 4, an access point (AP#4) broadcasts beacons that contain a network identifier b1. A mobile router (MR#1) is attached to AP#4. Assuming that AP#4 is a new AP employing the procedure described here, MR#1 computes a hash for the received beacon b1 using a one-way hash function to generate a value b2. A preferred hash function is Lamports one-way function, employing for example SHA or MD5. Hash functions have the property that a given input will generally result in a unique output. Hash functions also typically require only minimal computational power. The access point associated with MR#1 adopts b2 as its network identifier and includes this in its beacons. MR#2 is listening to beacons and picks up the beacon of MR#1 access point. If MR#2 chooses to attach to MR#1's access point, it in turn computes a hash of b2, and uses the result b3 for the network identifier of its own access point. This process is carried through the rest of the chain if present. In the example of FIG. 4, the network identifier chain consist of b1, b2, b3, and b4.

In the event that AP#4 is a legacy access point, MR#1 generates a random value when it attaches to the access point, and uses this value as its network identifier. Mobile routers lower down in the chain compute new identifiers using the hash function as described.

Figure 5:
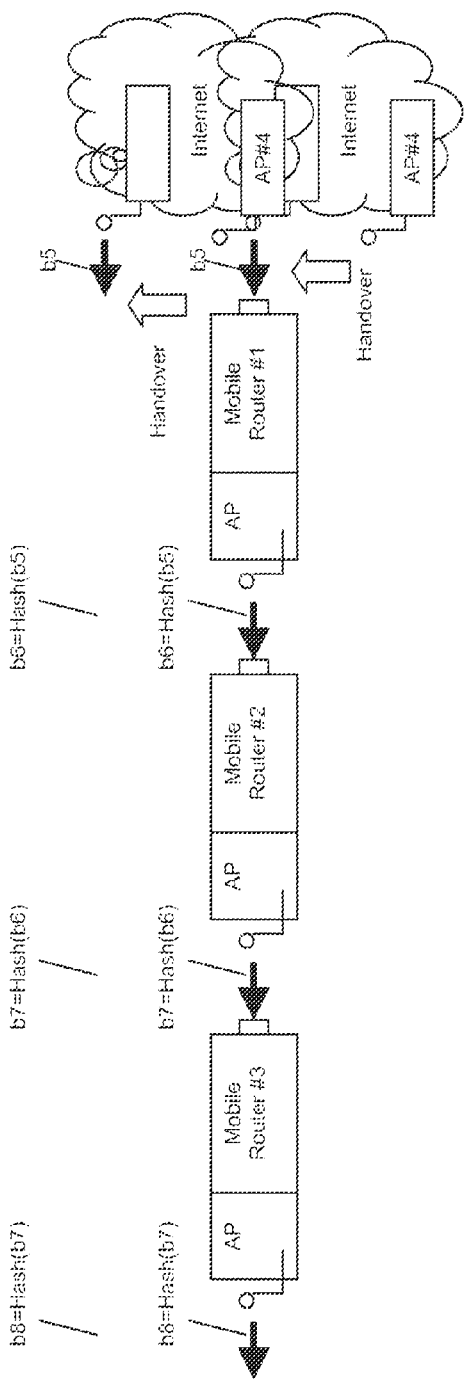
FIG. 5 illustrates schematically a handover situation in a moving network.

Consider now that MR#1 makes a handover and changes its access point from AP#4 to AP#5 as illustrated in FIG. 5. Once MR#1 attaches to the new access point (AP#5), MR#1 applies the hash function to compute a new network identifier for itself based on the received network identifier b5 (assuming that AP#5 implements the hash-based mechanism and is not a legacy access point). The resulting network identifier for MR#1 is b6. The nested mobile routers update their own network identifier in a recursive manner resulting in the new network identifier sequence b5, b6, b7, and b8. As a beacon will also contain a static identifier of the access point from which it is broadcasted, e.g. the MAC address of the access point, a listening mobile router will know that only the network identifier has changed and that the broadcasting access point remains the same. When a mobile router detects that a network identifier of the router access point to which it is attached has changed, it will immediately compute a new network identifier and include this in subsequently broadcast beacons.

Figure 6:
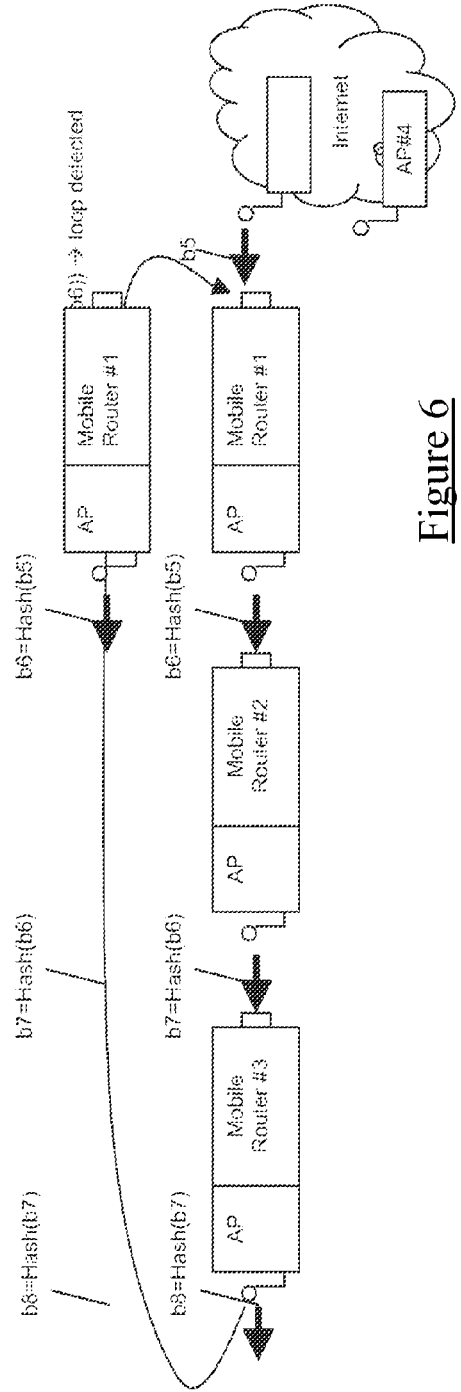
FIG. 6 illustrates schematically a routing loop detection mechanism in a moving network.

FIG. 6 illustrates an example scenario in which MR#1 decides to change its access point (e.g. due to the radio link with the existing access point deteriorating to an unacceptable quality level). MR#1 must listen to beacons to decide which new access point to attach to. In the illustrated example, MR#1 receives a beacon from the access point associated with MR#3. This beacon contains the network identifier b8. MR#1 computes (or has previously computed and stored) network identifiers in the chain below it, in this case b7 and b8. By comparing the network identifier in the received beacon against the computed/stored identifiers, MR#1 is quickly able to determine that the beacon is associated with a mobile router below MR#1 in the sub-network chain. A routing loop can therefore be avoided.

An upper limit is set for the recursive loop computation, for example ten. Thus, if the MR#1 does not find a match in the hash chain after ten iterative applications of the hash function, it may attach to the access point. Running for example the SHA-1 function 100 times for a 100 bit long string is relatively fast (a couple of milliseconds).

Figure 7:
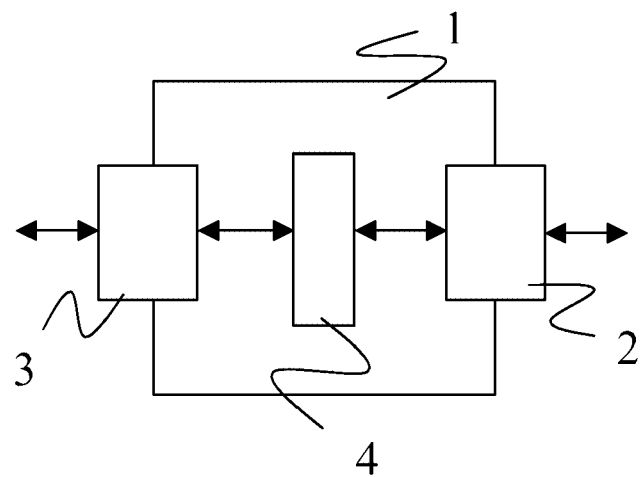
FIG. 7 illustrates schematically a mobile router and its main functional components.

FIG. 7 illustrates schematically a mobile router/access point 1 and its main functional components. These include the upstream (IEEE 802.11) interface 2 and the downstream (IEEE 802.11) interface 3, and a processing/memory means 4 which performs the network identifier generation process and, in the case of an attempted handover, the tasks of genaring the hash chain values and comparing these against network identifiers contained in received beacons.

Figure 8:
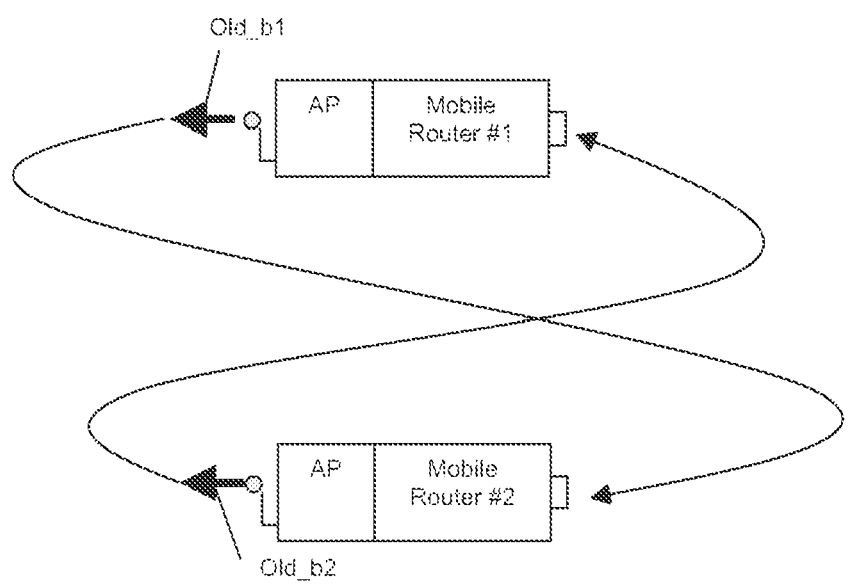
FIG. 8 illustrates schematically a race condition in a moving network.

It is necessary to consider the scenario where a mobile router higher up in a sub-network chain performs a first handover and generates a new network identifier for itself using the above procedure. It will take time for new identifiers to be propagated down to the end of the chain. In the absence of a suitable mechanism, it is possible that, in the meantime, the mobile router will attach to an access point lower down in the chain and which has not yet generated new network identifier. In this case, the network identifier contained in the received beacon will look like a valid identifier, as it is not present in the new hash chain, and a loop condition may arise. This is referred to here as a "race" condition and is illustrated in FIG. 8.

Figure 9:
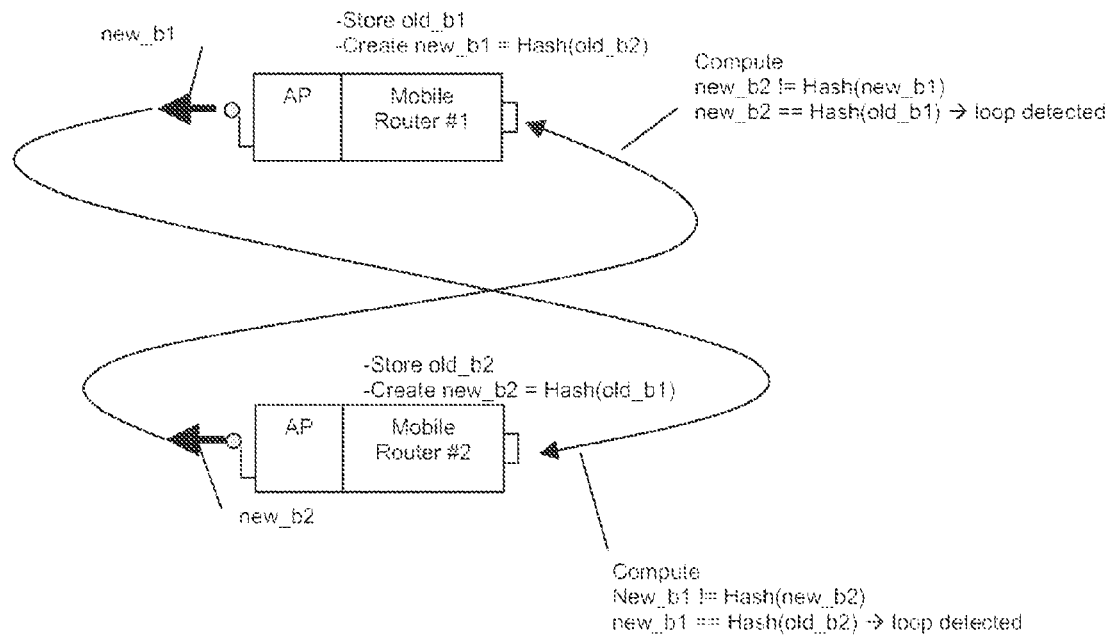
FIG. 9 illustrates schematically a mechanism for handling a race condition in a moving network.

A solution to this problem is illustrated in FIG. 9 where Mobile Router#1, which is originally at the top of a sub-network chain, seeks to attach to Mobile Router#2 which is lower down in the original chain. The mobile routers are configured to retain old network identifier chains for some suitable time period, typically slightly longer than the time taken for the network identifier to propagate down a sub-network chain, e.g. 30 seconds. In this case, when Mobile Router#1 receives the beacon from Mobile Router#2, the beacon will contain a network identifier b2 which is the hash of the old b1, Mobile Router#2 not yet having updated its network identifier. Mobile Router#2 will compare the received b2 against the hash chain values of both the new and the previously used chain. It will reject attachment if either chain results in a match.

A further enhancement may be achieved by performing a routing loop check every time an access point changes the network identifier contained in its beacon. Thus, if a routing loop does arise, for example due to a mobile router not acting as expected, the routing loop will be detected relatively quickly and appropriate action can be taken, i.e. detachment.

Figure 10:
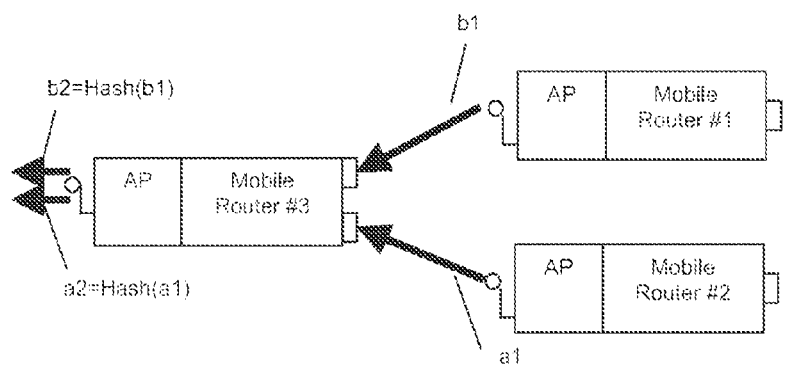
FIG. 10 illustrates schematically a multi-homed mobile router scenario in a moving network.

It is envisaged that a given mobile router may have, simultaneously, two or more points of attachment to the Internet (or another IP network) either directly or via respective mobile routers. This so-called "multi-homing" scenario is illustrated in FIG. 10, where a mobile router MR#3 has attached to two upstream mobile routers, MR#1 and MR#2. MR#3 learns the respective network identifiers, b1 and a1, of the two upstream routers. In order to employ the loop prevention mechanism discussed above, MR#3 generates two network identifiers for itself by applying the hash function to b1 and a1 in turn. The result is a pair of network identifiers b2 and a2. MR#3 broadcasts two beacons in turn, a first containing b2 and a second containing a2 (and indicates using a field BC of the SSID how many beacons it concurrently uses, see below). Mobile routers listening to the beacons are able attach to MR#3 using either one of the network identifiers. MR#3 is able to perform loop detection by listening for beacons containing network identifiers which are derived from either b2 or a2. In the event that a mobile router (e.g. MR#3) has two downstream interfaces, it will broadcast both beacons on both interfaces. Using the respective static identifiers, a downstream mobile router is able to determine that the upstream router has two different interfaces.

It will be appreciated that it is possible to generate an appropriate chain of network identifiers using any recursive algorithm that produces uniformly distributed results and lacks repetitive tendencies, i.e. repeated applications of the algorithm do not result in duplication of the same result. However, use of a hash function has a particular advantage in that it is one-way, i.e. only lower values in the chain can be derived from higher values and not the other way around. Consider a "rogue" access point that wants to lure a mobile router to attach to it. If the network identifier chain were reversible, the rogue access point could merely listen to the beacon of the mobile router that it wants to attract, reverse the network identifier contained in the beacon a couple of steps, and broadcast the derived identifier in its own beacon. The attacked mobile router would receive that beacon and think that it originates from an upstream access point offering better connectivity. The attacked router would then change its point of attachment to the rogue access point. Employing a hash function to generate the network identifiers for the sub-network chain prevents this sort of attack.

Further Detailed Consideration

The following pseudo-code defines the basic functionality of a mobile router (or "client") once it decides to make a handover:

```
my_netid; /* contains the network id that is being advertising */
cur_netid; /* we are attached to this access point */
new_netid; /* received new network id */
If (new_netid != cur_netid) {
    tmp_netid = my_netid;
    For (count = 0; count < MAX_LOOP; count++) {
        If (tmp_netid ==new_netid) {
            /* we end up in a loop */
            Return attachment_fail;
        }
        tmp_netid = Hash(tmp_netid);
        }
        cur_netid = new_netid; /* attach to the new ap */
        my_netid = Hash(new_netid) /* change own net id */
        return attachment_ok;
}
```

In order to prevent two "parallel" sub-network chains attached to the same access point generating the same network identifier chains, the first mobile router/access point attaching to an infrastructure access point should not set its own hash chain value to a hash value (of the received SSID), but should instead generate a random value. Checksum (CS) bits are included in the SSID to enable a mobile router to determine whether or not the access point is legacy. The SSID consists of the following bits:

CS 10 bits|BC 4 bits|LC 4 bits|HCV 14 bits| where

CS: A checksum over the entire contents of the beacon, indicating support for the hash chain scheme.

BC: A beacon counter indicating the number of different beacons (i.e. hash chain values) that an access point concurrently uses, e.g. (a value 1111 indicates "15 or greater"). A listening mobile router will know how many successive beacons it must receive before it can conclude the loop detection test. If a certain configurable threshold value is exceeded (i.e. if the listening mobile router considers the number of beacons to be too many to wait for), the mobile router should fall back, for example, to a loop detection solution to be performed after attachment (e.g. probe type).

LC: A link counter, indicating the number of values in the hash chain. The value 1111 indicates "15 or greater". Each mobile router in a chain increments the link counter by 1.

HCV: The hash chain value itself.

The exact number of bits in each field may of course vary depending on expected scenarios.

It will be appreciated by the person of skill in the art that various modifications may be made to the above described embodiments without departing from the scope of the present invention.

The invention claimed is:

1. A first mobile router for use in a moving network, the first mobile router comprising:
    means for receiving a beacon broadcast by a second mobile router or a fixed access point, said beacon containing a first network identifier belonging to the broadcasting second mobile router or fixed access point;
    a first interface for attaching to the second mobile router or fixed access point as an upstream access point;
    a second interface for attaching to a downstream access point;
    means for attaching to said second mobile router or said fixed access point using said first network identifier;
    means for generating a second network identifier for the first mobile router to adopt as a network identifier of the first mobile router by applying a pre-defined function to said first network identifier; and
    means for broadcasting beacons containing the second network identifier;
    wherein said means for attaching further comprises:
        means for iteratively calculating a result of the pre-defined function with said second network identifier as an initial input to obtain a chain of network identifiers that can possibly be assigned to access points downstream from the first mobile router;
        means for comparing a network identifier contained in a subsequently received beacon against the network identifiers of said chain and, if the network identifier contained in the subsequently received beacon matches one of the network identifiers of said chain, for rejecting a mobile router associated with the subsequently received beacon as a possible point of attachment to avoid creating a routing loop in the moving network.

2. The first mobile router according to claim 1, said means for attaching further comprising means For storing a previous chain of network identifiers following generation of a new network identifier,
    said means for comparing a network identifier contained in a subsequently received beacon against the network identifiers of said chain also comparing the subsequently received network identifier against the network identifiers of the previous chain.

3. The first mobile router according to claim 2, said means for storing being arranged to store said previous chain for a predefined time period before discarding the previous chain.

4. The first mobile router according to claim 1, wherein said pre-defined function is a pre-defined recursive function.

5. The first mobile router according to claim 4, wherein said pre-defined recursive function is a Lamports one-way scheme.

6. The first mobile router according to claim 1, wherein said pre-defined function involves a hash function.

7. The first mobile router according to dam 1, said means for broadcasting beacons further comprising means for constructing beacons containing said second network identifier and containing one or more of the following:
    a static identifier;
    a checksum calculated over the remainder of the beacon;
    a beacon counter indicating the number of different beacons that the first mobile router is concurrently broadcasting; and
    a link counter indicating the number of values in a hash chain.

8. The first mobile router according to claim 1, said first mobile router comprising a third interface for attaching to a third mobile router or a further fixed access point,
    wherein said means for receiving includes means for receiving a third network identifier belonging to the third mobile router or the further fixed access point,
    wherein said means for attaching includes means for attaching to the third mobile router or further fixed access point as a further upstream access point using the third network identifier,
    wherein said means for generating applies the pre-defined function to the third network identifier to generate a fourth network identifier, and
    wherein said means for broadcasting beacons includes means for broadcasting beacons containing the fourth network identifier in a cyclical manner.

9. The first mobile router according to claim 1, wherein the mobile router is compliant with the IEEE 802.11 standard.

10. A method of generating network identifiers for use by mobile routers of a moving network, the method comprising:
    receiving at a mobile router of a sub-network chain a beacon from a preceding mobile router in the chain, the beacon containing a network identifier of the preceding mobile router, and the receiving mobile router including a first interface for attaching to the preceding mobile router as an upstream access point and a second interface for attaching to a downstream access point;
    generating a new network identifier for the receiving mobile router to adopt as the network identifier of the first mobile router by applying a pre-defined function to the received network identifier;
    iteratively calculating a result of the pre-defined function with said new network identifier as an initial input to obtain a chain of network identifiers that can possibly be assigned to access points downstream from the receiving mobile router;
    comparing a network identifier contained in a subsequently received beacon against the network identifiers of said chain;
    if the network identifier contained in the subsequently received beacon matches one of the network identifiers of said chain, rejecting a mobile router associated with the subsequently received beacon as a possible point of attachment to avoid creating a routing loop in the moving network; and
    including the new network identifier in beacons broadcast by the receiving mobile router.

11. The method according to claim 10, wherein a network identifier of the mobile router at the top of the sub-network chain is generated by the mobile router at the top of the sub-network chain as a random number.

12. The method according to claim 10, wherein a network identifier of the first mobile router, in the sub-network chain, that supports the network identifier generation mechanism based on the predefined function is generated by the first mobile router that supports the network identifier generation mechanism as a random number.

13. The method according to claim 10, wherein said predefined function uses a hash function.

14. A method of detecting a potential routing loop in a moving network in which mobile routers of the network generate network identifiers comprising the steps of:
- receiving at a mobile router of a sub-network chain a beacon from a preceding mobile router in the chain, the mobile router including a first interface for attaching to the preceding mobile router as an upstream access point and a second interface for attaching to a downstream access point, and the beacon containing a network identifier of the preceding mobile router;
- generating a new network identifier for the receiving mobile router to adopt as its own network identifier by applying a pre-defined function to the received network identifier, and including the new network identifier in beacons broadcast by the receiving mobile router,
- said receiving mobile router listening to beacons broadcast by access points of other mobile routers,
- comparing network identifiers contained in the beacons received from other mobile routers with a plurality of network identifiers generated by recursively applying said predefined function to the new network identifier of the receiving mobile router, and
- identifying a potential routing loop if a match occurs in the comparison of the network identifiers received from other mobile routers with the plurality of recursively generated network identifiers.

15. The method according to claim 14 comprising:
- storing at the receiving mobile router for a predefined time period after a new network identifier has been generated by the receiving mobile router, a generated set of network identifiers corresponding to a network identifier previously used by the receiving mobile router or means for generating this set, and
- performing said step of comparing the beacons received from other mobile routers also with the previously used set for said predefined time period.

* * * * *

UNITED STATES PATENT AND TRADEMARK OFFICE
CERTIFICATE OF CORRECTION

PATENT NO. : 8,665,782 B2  
APPLICATION NO. : 12/443624  
DATED : March 4, 2014  
INVENTOR(S) : Ylitalo et al.

Page 1 of 1

It is certified that error appears in the above-identified patent and that said Letters Patent is hereby corrected as shown below:

In the Claims:

In Column 7, Line 57, in Claim 2, delete "For storing" and insert -- for storing --, therefor.

In Column 8, Line 8, in Claim 7, delete "dam 1," and insert -- claim 1, --, therefor.

Signed and Sealed this  
Twenty-second Day of July, 2014

Michelle K. Lee  
*Deputy Director of the United States Patent and Trademark Office*